United States Patent [19]

Pierce

[11] Patent Number: 4,997,224
[45] Date of Patent: Mar. 5, 1991

[54] COMPACT DISC REMOVAL TOOL

[76] Inventor: James N. Pierce, 1875 W. Sunkist Rd., Tucson, Ariz. 85704

[21] Appl. No.: 399,070

[22] Filed: Aug. 24, 1989

[51] Int. Cl.⁵ .............................................. B25B 9/02
[52] U.S. Cl. ...................................... 294/16; 294/33; 294/99.2
[58] Field of Search ................. 294/33, 16, 99.1, 99.2, 294/158, 145, 27.1, 6, 31.1

[56] References Cited

U.S. PATENT DOCUMENTS

| | | |
|---|---|---|
| 3,219,375 | 11/1965 | Pelt . |
| 3,317,989 | 5/1967 | Cull .................... 294/99.2 X |
| 3,602,540 | 8/1971 | Page . |
| 3,961,819 | 6/1976 | Yocum . |
| 4,141,138 | 2/1979 | Quick . |
| 4,368,912 | 1/1983 | Holtz . |
| 4,595,221 | 6/1986 | de Geus . |
| 4,662,667 | 5/1987 | Gilligan et al. ........................ 294/16 |
| 4,726,615 | 2/1988 | Goldberg .............................. 294/16 |

Primary Examiner—Margaret A. Focarino
Assistant Examiner—Dean J. Kramer
Attorney, Agent, or Firm—J. Michael McClanahan

[57] ABSTRACT

A compact disc removal tool for removing a compact disc from holding tabs in its carrying case, for transporting the disc to a compact disc player machine, and for replacement of the disc in its carrying case. The tool consists of a pair of longitudinally aligned, oppositely directed elongated arms having at their opposite distal ends outstanding cupped fingers adapted to encompass opposite sides of a compact disc, the arms connected at the point proximate each other to a central body split ring oriented transversely to the longitudinal direction of the arms. Centrally located on the removal tool on each arm proximal end for disengaging the carrying case disc holding tabs is a partial circular arc ridge adapted to engage the disc circular face, an adjacent circular arc depression, and a vertical circular wall interposed the ridge and the depression. The split ring, when grasped and compressed over a compact disc in its carrying case, causes the cupped fingers to engage opposite sides of the compact disc while the circular walls simultaneously engage the carrying case holding tabs to release their hold upon the centrally located opening of the compact disc. With the release of the disc by the holding tabs, the disc is easily removed from its position in the holding case.

9 Claims, 1 Drawing Sheet

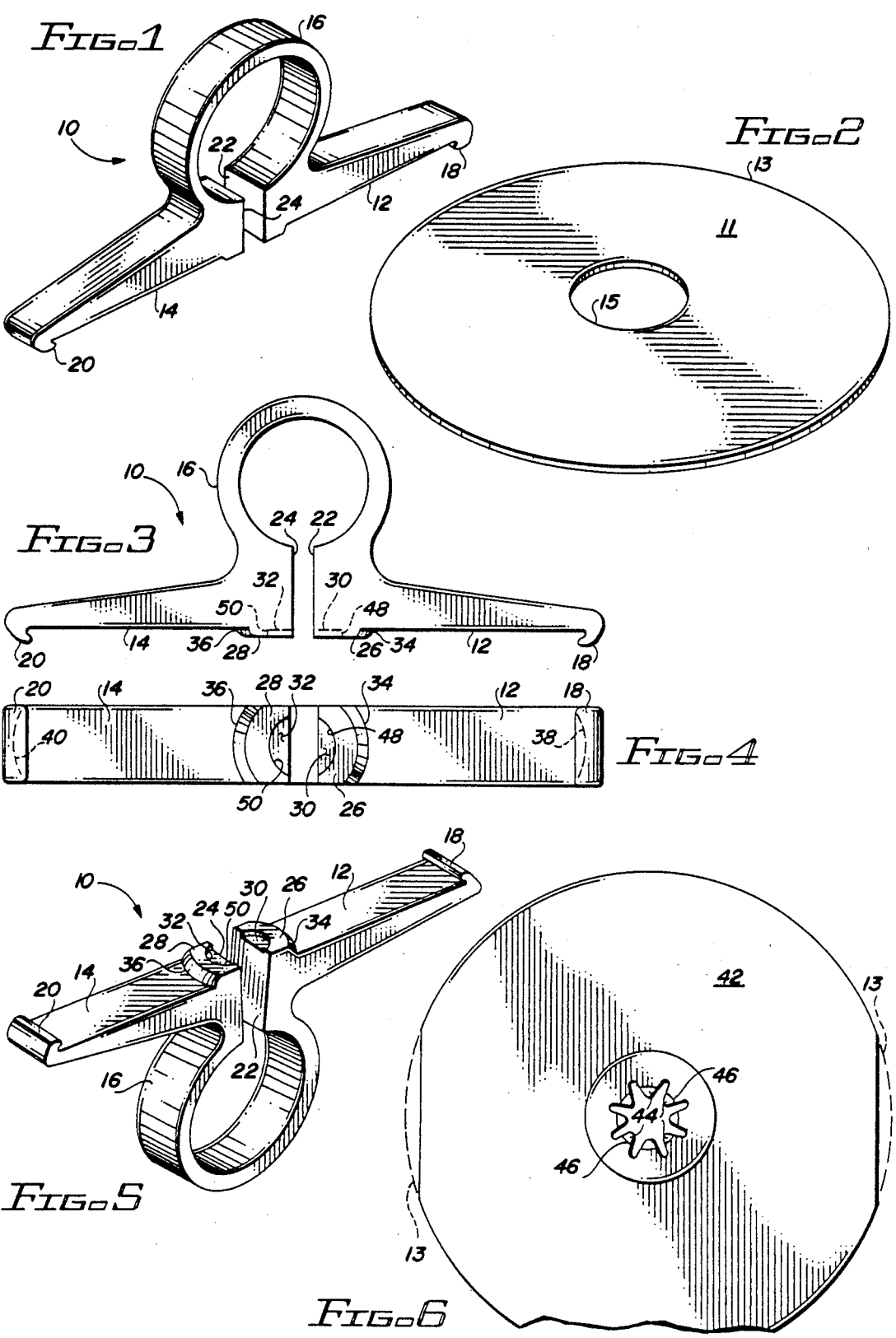

COMPACT DISC REMOVAL TOOL

BACKGROUND OF THE INVENTION

1. Field of the Invention

The field of the invention is devices adapted to facilitate the removal, carrying, and replacement of compact discs from their carrying case to and from compact disc player machines.

2. Description of the Related Art

Relatively new in the recorded music field have been the advent of compact discs. These compact discs, generally made of a thin circular sheet of aluminum, have music and voice recorded upon them in a laser encoded manner. The compact disc is utilized in compact disc player machines by rotation of the disc while passing over an operating laser, the laser so positioned to direct a beam of light to the underside of the compact disc wherein the light is reflected to light receiving means, such as light sensitive phototransistors. Operative circuitry attached to the light receiving means produce a very high quality, high fidelity reproduction of the voice and music originally recorded on the compact disc. Since the laser beam illuminates and reflects off a very small area of the compact disc, it is very important that the surface of the compact disc which reflects the laser beam be kept clean and free of dirt and other contaminates, such as body oil from a person's fingers, which, if present, would tend to distort the laser beam impinging upon the compact disc.

To that end, the compact disc manufacturers suggest that the compact disc be picked up by a person's fingers on opposite sides, at the peripheral edge, and if the disc must be handled, that only the top flat circular disc be touched inasmuch as the coded information is on the flat circular bottom of the disc. The disc is round, about 4⅜ inches in diameter, approximately 1/16 inch thick, and has a centrally located opening approximately 9/16 inch diameter.

While if one perfectly handles the compact disc with their fingers, transfer of skin oil to the bottom side of the disc may be avoided, however, it would be far better if there were available a tool which permitted the grasping of the disc for removal, carrying, and replacement purposes which avoided all possible human contact with the disc.

The compact discs are typically kept in a carrying case having a lid which swings open to reveal the compact disc inside. The carrying case is characterized by a centrally located hub with a plurality of upward protruding knee-shaped holding tabs, the sides of the holding tabs forming a circle adapted to receive the centrally located opening of the compact disc in a frictional engagement for securing the disc in the carrying case. When one lifts the disc from its carrying case by grasping the disc at opposite peripheral edges, removal of the disc is opposed by the holding tabs in the centrally located opening and by continual pulling of the disc upward and away from the carrying case will it slip off the holding tabs. However, in the process, one can observe the disc bending and flexing. Whether or not this injures the disc is unknown. Certainly, breakage may be possible. However, it has been the Inventor's experience that different manufacturer's holding cases utilize slightly different diameter holding tabs inasmuch for the same compact disc, some carrying cases release it easier than others. Accordingly, it is possible that some manufacturers may have a carrying case which grasp a compact disc so tightly via its holding tabs that in removal of the disc, breakage could occur.

It is to this end that it would be useful to provide a tool which permits the removal of the compact disc from its carrying case wherein the possibility of contamination of the face of the compact disc by the operator is completely avoided. It would also be advantageous if such tool accomplished removal of the compact disc from its carrying case by also acting upon the holding tabs such that they released the compact disc at the time that the disc is removed in order that possible cracking or breaking of the compact disc is avoided.

Accordingly, there is an advantage of providing a compact disc removal tool which grasps the compact disc at opposite peripheral sides as intended by the compact disc manufacturer and which, at the same time, acts upon the holding tabs to reduce their frictional engagement of the compact disc centrally located opening in order that removal of the compact disc from its carrying case is performed in a relatively effortless manner and operator contamination of the compact disc is avoided.

SUMMARY OF THE INVENTION

This invention relates to a compact disc removal tool for use in removing compact discs from their carrying case and placing it onto the compact disc player machine and then removing the compact disc from the player machine and replacing it into the carrying case. By the use of the subject compact disc removal tool, contamination of the compact disc by human skin oil is avoided and, in addition, possibility of breakage of the compact disc when the disc is removed from its carrying case is avoided due to excessive frictional engagement of the compact disc by the carrying case holding tabs.

The inventive compact disc removal tool comprises a pair of elongated, longitudinally aligned, oppositely directed arms attached at the point of closest proximity to each other by a central body split ring situated perpendicularly to the arms longitudinal direction. At the distal ends of the oppositely directed arms are a pair of cupped over fingers, the fingers being the means which extend over (for holding) the peripheral edge of opposite sides of the compact disc. The central body split ring, which is grasped and compressed by the operator, provides the means for pulling the two arms towards each other and toward the split ring in order that the cupped fingers engage and hold the compact disc. Means are provided to limit the longitudinal travel of the oppositely situated arms, namely by a pair of abutting faces which appear at the ends of each of the arms proximate each other. These faces also limit the amount which the central body split ring may be compressed to prevent its breakage.

Further, along the inside edge of the cupped fingers, where they join the underside of the oppositely extending arms, the edge takes on an arc which has a radius equal to the radius of a compact disc. By this means, the peripheral edge of the compact disc is held throughout the full width of each of the arms.

Situated centrally to the inventive compact disc removal tool is the means by which the holding tabs of the carrying case are compressed to reduce the diameter of the circle which is formed when the compact disc is lifted from the carrying case inorder that the compact disc may be easily removed from the carrying case. To this end, the subject compact disc removal tool includes, at the point just outside the location where the tool encompasses the disc securing mechanism (holding tabs), oppositely situated arc shaped protruding ridges adapted to push down upon the compact disc. Immediately inside these ridges are partial circular depressions juxtaposed the ridges, the partial circular depression adapted to receive the holding tabs of the carrying case and to engage them on opposite sides by the circular vertical wall joining the ridges and the partial circular depression. This serves to reduce the diameter of the circle formed by these holding tabs when the arms are brought together by squeezing the split ring and thus ease their frictional pressure upon the centrally located opening of the compact disc.

In use, the compact disc removal tool is located atop the compact disc, such that the cupped fingers at the ends of the arms encompass the peripheral edge of the disc and then the central body split ring is squeezed while simultaneously pressing down on the disc. This brings the out extending elongated arms together, grasping the peripheral edge of the compact disc. Simultaneously, the protruding circular ridge proximate the inside ends of the arms next to each other press down upon the disc while the vertical wall (relative to horizontal extending arms) joining the partial circular depression engages the carrying case holding tabs to reduce their circular diameter and permits easy removal of the compact disc from the carrying case.

By keeping the central body split ring squeezed together, the compact disc is continually held and may be transported to the compact disc player machine and placed upon the machine mechanism adapted to receive the disc. Once the disc has been put into its proper place, squeeze pressure upon the central body split ring is released allowing the arms to move away from each other and allowing the cupped fingers at the ends of each arm to clear the peripheral edge of the compact disc. The tool is then removed.

A compact disc is easily removed from the compact disc player machine by utilizing the removal tool wherein the arms are allowed to come down and encompass the opposite peripheral edges of the compact disc and then, when the central body split ring is grasped and squeezed, the cupped fingers at the distal ends of the arms engage the peripheral edge of the compact disc and allow its removal. In compact disc player machines known to the inventor, no central opening holding mechanism is present. Thus the compact disc may be easily removed from the player machine and then replaced in the carrying case.

To replace the compact disc into its carrying case, the compact disc is aligned over the central opening holding mechanism and then pushed down over this holding mechanism by the subject removal tool. Once the disc has been engaged by the holding tabs, squeeze pressure on the central body split ring is released and the arms move apart, no longer grasping the compact disc. At this point, the disc has already begun to be engaged by the holding tabs, however the disc has not been fully seated. Nevertheless, by pushing down upon the central body split ring, the oppositely situated circular ridges push down upon the compact disc and fully seat it upon the holding tabs in the carrying case.

It is an object of the subject invention to provide a compact disc removal tool which engages opposite sides of the compact disc to remove the compact disc from its carrying case.

It is another object of the subject invention to provide a compact disc removal tool which provides a mechanism for engaging the holding tabs of a compact disc carrying case to release their engagement of the central opening of a compact disc in order to facilitate removal of the compact disc from its carrying case.

It is still object of the subject invention to provide a compact disc removal tool wherein opportunity for operator contamination of the surfaces of a compact disc is obviated.

Other objects of the invention will in part be obvious and will in part appear hereinafter. The invention accordingly comprises the apparatus and method comprising construction, combination of elements, and arrangement of parts which are exemplified in the following detailed disclosure, and the scope of the application which will be indicated.

BRIEF DESCRIPTION OF THE DRAWINGS

For further understanding of the nature and objects of the present invention, reference should be had to the following detailed description taken in connection with the accompanying drawings wherein:

FIG. 1 is a perspective view of the subject invention;

FIG. 2 is a perspective view of a compact disc;

FIG. 3 is a front view of the subject invention;

FIG. 4 is a bottom view of the subject invention;

FIG. 5 is a perspective view of the subject invention taken from a perspective different than that of FIG. 1; and FIG. 6 is a top view of a compact disc carrying case.

In various views, like index numbers refer to like elements.

DETAILED DESCRIPTION OF THE PREFERRED EMBODIMENT

Referring now to FIG. 1, a perspective view of the compact disc removal tool 10 is shown detailing its outwardly extending, longitudinally aligned, oppositely directed elongated arms 12 and 14, arms 12 and 14 attached on opposite sides of the centrally located, central body split ring 16, arm 12 connected at one side of the split of split ring 16 and arm 14 connected at the other side of split ring 16. The plane in which central body split ring 16 is situated is arranged at a 90 degree angle to the longitudinal direction of the arms 12 and 14. A gap or space is situated between opposite ends of split ring 16 and arms 12 and 14, the space defined by faces 22 and 24 at the ends of arms 12 and 14 respectively.

Located at distal ends of arms 12 and 14 are perpendicularly extending cupped fingers 18 and 20 respectively, the fingers bending downward and slightly inward toward the central split ring area of the compact disc removal tool. The split ring 16 portion of tool 10 is designed to be grasped and have its ends squeezed together by the operator such that face 22 at one end of split ring 16 (and also arm 12) will come together or almost touch the oppositely situated face 24 on the other end of split ring 16 (and also arm 14).

In using the compact disc removal tool 10, the tool is held by the operator and placed over the compact disc such that arms 12 and 14 extend from side to side across the disc and fingers 18 and 20 extend down and completely encompass the peripheral edge of the disc. The operator then brings together opposite faces 22 and 24 by squeezing or compressing central body split ring 16 until the compact disc is securely held on opposite sides by engagement of fingers 18 and 20 around its peripheral edge. Then, by pulling the central disc away from its carrying case, the compact disc is removed for placement onto the player. Keeping the central body split ring 16 compressed, the compact disc is carried over to the compact disc player machine where upon it is situated on the turntable adapted to receive the compact disc and, by releasing the squeezing pressure on split ring 16, fingers 18 and 20 release their grip on the compact disc allowing the disc to become separated from the inventive removal tool.

As seen in FIG. 1, and more clearly shown in the following figures, the compact disc removal tool 10 is about 5 inches in length, approximately 11/16 inch wide, and 2¼ inches high. Compact discs have a standard diameter which measures approximately 4⅝ inches and are approximately 1/16 inch thick. Of course, the inventive removal tool 10 may have its appropriate dimensions modified to accomodate different size discs. The inventive compact disc removal tool 10 has been so designed that when the arms are fully extended, such as shown in FIG. 1, the distance between outer fingers 18 and 20 is greater than the peripheral diameter of a compact disc in order that the fingers will easily and readily slip over the peripheral edge of the compact disc. However, there is sufficient gap between opposite ends of central body split ring 16 that the arms may be brought together with the compact disc firmly held by the oppositely situated fingers before the split ring faces 22 and 24 touch. By such construction, assurance is always provided that these oppositely situated faces on split ring 16 will not engage before the compact disc is securely held.

Referring now to FIG. 2, a typical compact disc is shown in a perspective view wherein numeral 11 represents the compact disc having an outer circular peripheral edge 13 and a centrally located opening with inner circular peripheral edge 15.

Referring now to FIGS. 3-5, view of the compact disc removal tool 10 are shown wherein distinctive features of the invention are more fully disclosed than was possible in the perspective view of FIG. 1. In particular, FIG. 3 is a front view of compact disc removal tool 10 showing essentially the features described in FIG. 1, i.e., the oppositely extending arms 12 and 14, the fingers 18 and 20 at the opposite ends respectively of those arms, and the central body split ring 16 with its oppositely situated end faces 22 and 24. Noted situated at the ends of the arms 12 and 14 closest to each other (proximal ends) is the mechanism designed to facilitate the release of the compact disc from its carrying case (shown in FIG. 6), namely means to compress the holding tabs of the carrying case, the holding tabs arranged in a circle and adapted to protrude upwardly through the central opening situated in the compact disc. These holding tabs secure tightly the compact disc by forcibly pressing against the inside peripheral edge of the compact disc central opening.

Firstly, the holding tabs compression means shown in FIG. 3 (and FIGS 4 and 5), comprise a partial circular ridge of which ridge portions 26 and 28 are situated upon the lower surface of the proximal ends of arms 12 and 14 respectively. This downward protruding ridge is adapted to engage the compact disc on its flat circular surface just outside, but next to, its centrally located opening. The partial circular ridge presses down upon the flat circular surface of the compact disc and allows the holding tabs attached to the carrying case to rise up into the partial circular depression 30 and 32. The circular wall which joins the depression to the ridge then engages the holding tabs. The depth of partial circular depressions 30 and 32 (as measured from the top of ridges 26 and 28) are such that when compact disc removal tool 10 is situated atop a compact disc held in its carrying case with partial circular arc ridges 26 and 28 engaging the top flat surface of the compact disc, the holding tabs of the carrying case (which protrude above the compact disc) have bottomed out upon the surface of partial circular depression 30 and 32. Partial circular arc ridges 26 and 28 then join to the flat under surface of arms 12 and 14 with sloped sides 34 and 36.

The holding tabs 44 (FIG. 6) in the carrying case are so constructed that they form a knee like configuration, starting from the flat surface of the carrying case, rising up (where they grip the interior peripheral of the compact disc central opening) and then, once above the compact disc, bend towards the center of the circle formed by the holding tabs. The removal tool vertical circular walls, numbers 48 and 50, are close to engaging the knees of the holding tabs (and do when the split ring is compressed). This action reduces the effective diameter of the circle formed by the holding tabs and lessens their grip on the compact disc.

FIG. 4 is a bottom view of the subject compact disc removal tool especially detailing the mechanism designed to facilitate the release of the compact disc from the carrying case holding tabs, namely the partial circular depressions 30 and 32 and their adjacent vertical walls 48 and 50 respectively, curved to receive the holding tabs 44 (FIG. 6) and then to compress them inwardly in order to reduce their frictional engagement upon the centrally located opening of the compact disc (FIG. 2). Immediately surrounding the partial circular depressions 30 and 32 are the protruding partial circular arc ridges 26 and 28 which extend outwardly from the central portion of the subject tool and then join the flat underside of the proximal ends of oppositely directed arms 12 and 14 through the means of slopes 34 and 36 respectively. At the opposite distal ends of arms 12 and 14 are the perpendicularly extending fingers 18 and 20 respectively. It is noted in FIG. 4 that the inside edge formed along the width of the flat under surface of arms 12 and 14 and their respective fingers 18 and 20 is arcuate, shown by dotted lines 38 and 40. This arcuate edge has a radius equal to the radius of a compact disc in order that the compact disc may be more securely held by the subject removal tool for the full width of the arms.

FIG. 5 is a perspective view of the subject inventive compact disc removal tool 10 showing more clearly the mechanism designed to facilitate the release of the compact disc from its carrying case holding tabs. Ridges 26 and 28 are shown prominently along with depressions 30 and 32 separated by curved vertical walls 48 and 50 respectively. On the opposite sides of ridges 26 and 28 are slopes 34 and 36 respectively. Also shown is face 22 which terminates at depression 30. Lastly, the two fingers 18 and 20 are shown at opposite ends of arms 12 and 14 respectively. Central body split ring 16 is detailed connecting the two arms 12 and 14.

In the preferred embodiment, the invention was constructed of plastic, however, it is obvious that wood or metal construction may be utilized so long as the split ring will return the arms to their original out-extending position when the split ring is no longer compressed.

Lastly, FIG. 6 shows a portion of a compact disc carrying case 42 with the centrally located compact disc securing mechanism, namely holding tabs 44. As mentioned earlier, holding tabs 44 are attached to carrying case 42 and comprise a plurality of fingerlike extensions emerging from the floor of carrying case 42 to form a knee represented by line 46, the fingers then bending over to point inward. These fingers, which comprise the holding tabs, are made from thin spring steel so that when the compact disc shown in FIG. 2 is placed into the carrying case 42, the centrally located opening 15 slips over the holding tabs 44 to frictionally reside on the knee 46. Shown in dotted relief in FIG. 6 is a compact disc 13.

To operate the compact disc removal tool as shown in FIGS. 1 and 3-5, tool 10 is placed downward over the compact disc 13 situated in carrying case 42 shown in FIG. 6. The fingers 18 and 20 slip over the outside of the compact disc 13 on the sides of the carrying case. At these particular points, carrying case 42 has a void and thus does not interfere with fingers 18 and 20. Then, the arms connected to central body split ring 16 are brought together by the person's fingers squeezing the removal tool. Before the faces 22 and 24 touch one another, the inward motion of the arms is stopped by fingers 18 and 20 engaging opposite sides of compact disc 13. Simultaneously with squeezing the central body split ring 16 of the removal tool 10, the tool is pushed down upon carrying case 42 which allows holding tabs 44 to enter circular arc depressions 30 and 32 of removal tool 10. These holding tabs are engaged by the vertical walls of the tool and squeezed toward their common center which releases the pressure applied by holding tabs knees 46 upon the centrally located opening 15 of a compact disc. The disc then is very easily lifted up off carrying case 42 for transporting to a player.

Once the compact disc is put into the proper place on the player, pressure applied by the person's fingers on the central body split ring 16 is released, split ring 16 springs back to its original open position, and arms 12 and 14 come apart allowing the compact disc to remain in the player. If the compact disc player is equipped with the same disc holding mechanism as is the carrying case, releasing the compact disc on the player will leave it slightly up on the knee of its respective holding tabs. Then, the removal tool which now has its arms fully expanded, may be used to push the compact disc down onto the holding tabs, ridges 26 and 28 pushing the disc down.

While a preferred embodiment of the subject invention has been shown and described, it will be understood that there is no intent to limit the invention by such disclosure, but rather it is intended to cover all modifications and alternate constructions falling within the spirit and the scope of the invention as defined in the appended claims.

I claim:

1. A compact disc removal tool for removing a compact disc from holding tabs in its carrying case, for transporting the disc to a compact disc player machine, and for replacement of the disc in its carrying case, the tool comprising:

a pair of oppositely directed elongated arms, each arm having a distal end and a proximal end, said proximal ends juxtaposed each other;

a pair of outstanding cupped fingers attached to said elongated arms, said cupped fingers adapted to encompass and grasp opposite sides of a compact disc;

a compressible central body split ring operably attached to said elongated arms, said split ring adapted to be compressed to bring said elongated arms together; and means integrally formed in said elongated arms proximal ends to engage and compress the holding tabs of the compact disc carrying case to release the compact disc from the holding tabs of the carrying case whereby when said central body is pushed down and compressed over the compact disc, the holding tabs are compressed and said elongated arms cupped fingers encompass and grasp opposite sides of a compact disc to lift the compact disc out of its carrying case.

2. The compact disc removal tool as defined in claim 1 wherein said pair of oppositely directed elongated arms are longitudinally aligned with each other.

3. The compact disc removal tool as defined in claim 2 wherein said means to engage and compress the holding tabs to release the compact disc from the holding tabs includes a pair of vertical circular walls which engage and compress the holding tabs.

4. The compact disc removal tool as defined in claim 3 wherein one each of said pair of vertical circular walls are formed in one each of said elongated arms proximal ends.

5. The compact disc removal tool as defined in claim 4 wherein each wall of said pair of vertical circular walls is defined by a circular arc depression formed in each of said elongated arms proximal ends, and a partial circular arc ridge protruding from each elongated arm, said partial circular arc ridge adapted to rest upon the compact disc while the circular arc depression receives the holding tabs in order for the circular walls to engage the holding tabs to compress the holding tabs to release their grip upon the compact disc.

6. The compact disc removal tool as defined in claim 5 wherein said central body split ring operably attached to said elongated arms is attached to said elongated arms at their proximal ends.

7. The compact disc removal tool as defined in claim 6 wherein said outstanding cupped fingers attached to said arms are attached to said elongated arms at their distal ends.

8. The compact disc removal tool as defined in claim 7 wherein said outstanding cupped fingers attached to said elongated arms distal ends form an inside edge at their point of joinder, said inside edge defining an arc having a radius adapted to engage the compact disc whereby the outer peripheral edge of the compact disc is engaged by said curved edge when said split ring is compressed to bring said elongated arms together.

9. The compact disc removal tool as defined in claim 8 wherein said elongated arms distal ends have flat opposing faces, said flat faces providing a stop to the compression of said central body split ring whereby said split ring may not be so compressed as to break.

* * * * *